United States Patent
Syoji et al.

(10) Patent No.: US 10,629,896 B2
(45) Date of Patent: Apr. 21, 2020

(54) POSITIVE ELECTRODE AND LITHIUM ION SECONDARY BATTERY

(71) Applicant: TDK CORPORATION, Tokyo (JP)

(72) Inventors: Tetsu Syoji, Tokyo (JP); Hideaki Seki, Tokyo (JP); Hirofumi Kakuta, Tokyo (JP); Shin Fujita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/437,756

(22) Filed: Feb. 21, 2017

(65) Prior Publication Data

US 2017/0250401 A1    Aug. 31, 2017

(30) Foreign Application Priority Data

Feb. 25, 2016  (JP) .................................. 2016-034156
Dec. 26, 2016  (JP) .................................. 2016-250324

(51) Int. Cl.
| | |
|---|---|
| *H01M 4/36* | (2006.01) |
| *H01M 4/13* | (2010.01) |
| *H01M 4/525* | (2010.01) |
| *H01M 4/58* | (2010.01) |
| *H01M 4/62* | (2006.01) |
| *H01M 10/0525* | (2010.01) |
| *H01M 4/02* | (2006.01) |

(52) U.S. Cl.
CPC ............. *H01M 4/364* (2013.01); *H01M 4/13* (2013.01); *H01M 4/525* (2013.01); *H01M 4/5825* (2013.01); *H01M 4/625* (2013.01); *H01M 10/0525* (2013.01); *H01M 2004/028* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0268339 A1 | 10/2008 | Suzuki | | |
| 2011/0168550 A1* | 7/2011 | Wang | .................. | H01M 4/0419 204/290.12 |
| 2015/0263337 A1* | 9/2015 | Naoi | ..................... | H01M 4/364 429/231.1 |

FOREIGN PATENT DOCUMENTS

JP    2008-277152 A    11/2008

OTHER PUBLICATIONS

Chen et al., Aluminum-doped lithium nickel cobalt oxide electrodes for high-power lithium-ion batteries, Journal of Power Sources, vol. 128, Issue 2, Apr. 5, 2004, pp. 278-285.*

* cited by examiner

Primary Examiner — Ladan Mohaddes
(74) Attorney, Agent, or Firm — Oliff PLC

(57) ABSTRACT

A positive electrode includes: a positive electrode current collector; and a positive electrode active material layer disposed on the positive electrode current collector. The positive electrode active material layer contains a lithium-containing transition metal oxide represented by composition formula (1) indicated below, and a compound represented by LiVOPO4. The lithium-containing transition metal oxide and the compound represented by LiVOPO4 are dispersed in the positive electrode active material layer.

$$Li_t Ni_x Co_y Al_z O_2 \qquad (1)$$

where $0.9 \leq t \leq 1.1$, $0.3 < x < 0.99$, $0.01 < y < 0.4$, $0.001 < z < 0.2$, and $x+y+z=1$.

10 Claims, 2 Drawing Sheets

POSITIVE ELECTRODE AND LITHIUM ION SECONDARY BATTERY

CROSS-REFERENCE TO RELATED APPLICATION

This application claims priority from Japanese Patent Application Nos. 2016-034156 filed on Feb. 25, 2016 and 2016-250324 filed on Dec. 26, 2016, with the Japan Patent Office the entire contents of which are hereby incorporated by reference.

BACKGROUND

1. Technical Field

The present disclosure relates to a positive electrode and a lithium ion secondary battery.

2. Description of the Related Art

Recent years have seen increasing expectations for widespread use of various electric vehicles, with a view to solving environmental and energy problems. A key to practical application of electric vehicles is a vehicle-mounted power supply, such as a motor-driving power supply. As such, lithium-ion secondary batteries are being intensively developed. In order for the battery to be widely adopted as a vehicle-mounted power supply, it is very important that the battery have high thermal stability.

A number of positive electrode active materials for lithium ion secondary battery have been proposed. One of the most typical examples is a lithium-containing transition metal oxide having a laminar structure, such as lithium cobalt oxide ($LiCoO_2$) and lithium nickel oxide ($LiNiO_2$). Lithium cobalt oxide ($LiCoO_2$) and lithium nickel oxide ($LiNiO_2$) have high capacity, and their discharge voltages with respect to lithium are also high at approximately 3.8 V. However, these oxides, when placed in high temperature state or high potential state, readily react with the electrolytic solution and release the oxygen in the crystal structure. Accordingly, thermal stability is not sufficient, particularly in highly charged state.

In this regard, JP-A-2008-277152 describes coating at least a part of the surface of the lithium-containing transition metal oxide core particles with a coating portion including $LiVOPO_4$, in order to increase thermal stability.

SUMMARY

A positive electrode includes: a positive electrode current collector; and a positive electrode active material layer disposed on the positive electrode current collector. The positive electrode active material layer contains a lithium-containing transition metal oxide represented by composition formula (1) indicated below, and a compound represented by $LiVOPO_4$. The lithium-containing transition metal oxide and the compound represented by $LiVOPO_4$ are dispersed in the positive electrode active material layer.

$$Li_tNi_xCo_yAl_zO_2 \quad (1)$$

where $0.9 \le t \le 1.1$, $0.3 < x < 0.99$, $0.01 < y < 0.4$, $0.001 < z < 0.2$, and $x+y+z=1$.

DESCRIPTION OF THE EMBODIMENTS

Figure 1:
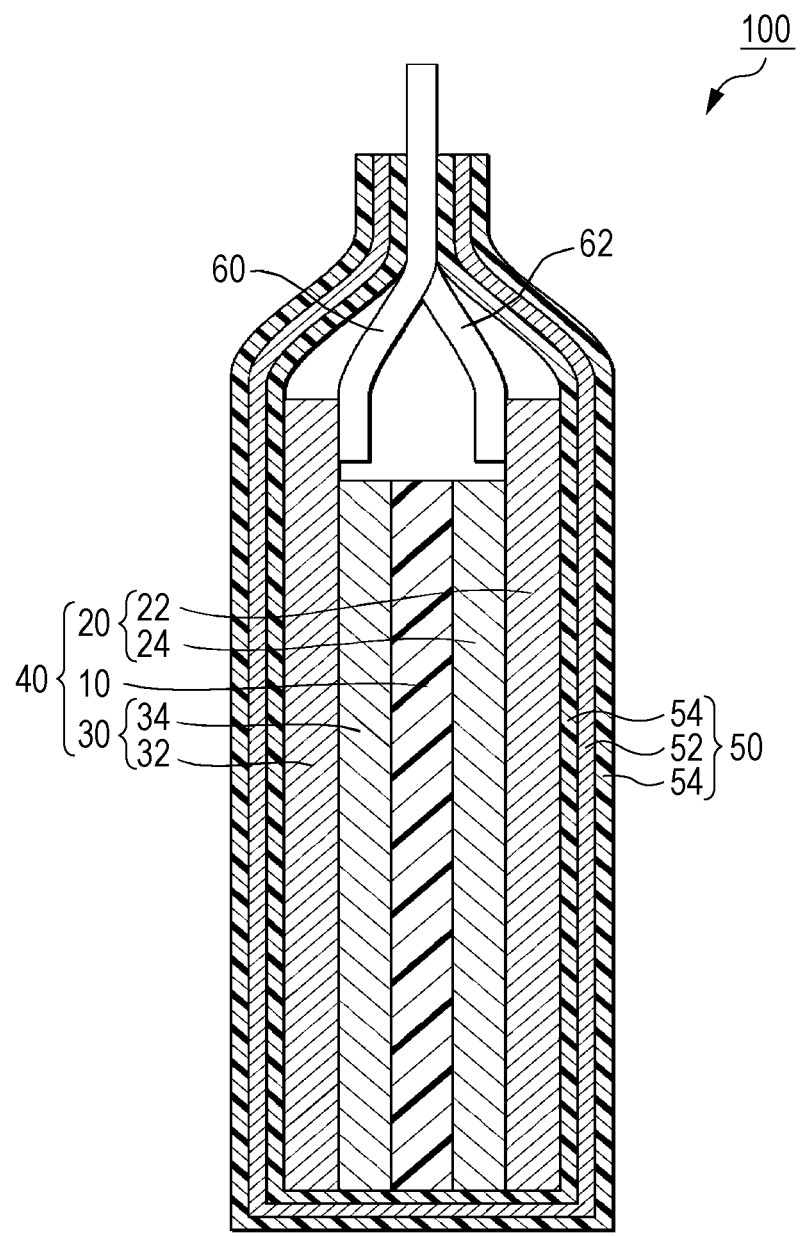
FIG. 1 is a schematic cross sectional view of a lithium ion secondary battery.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in the positive electrode active material described in JP-A-2008-277152, the rate performance is not necessarily sufficient. Accordingly, there is a demand for further improvement in rate performance.

An object of the present disclosure is to provide a positive electrode and a lithium ion secondary battery that have excellent thermal stability and high rate performance.

The positive electrode according to one aspect of the present disclosure is provided with the positive electrode current collector, and the positive electrode active material layer disposed on the positive electrode current collector. The positive electrode active material layer contains a lithium-containing transition metal oxide represented by composition formula (1) indicated below, and a compound represented by $LiVOPO_4$. The lithium-containing transition metal oxide and the compound represented by $LiVOPO_4$ are dispersed in the positive electrode active material layer.

$$Li_tNi_xCo_yAl_zO_2 \quad (1)$$

where $0.9 \le t \le 1.1$, $0.3 < x < 0.99$, $0.01 < y < 0.4$, $0.001 < z < 0.2$, and $x+y+z=1$.

In this configuration, high rate performance can be obtained. This is inferred to be due to the following reasons. That is, vanadium ions in the compound represented by $LiVOPO_4$ experience valence variation. This helps charge compensation of the interface of the compound represented by $LiVOPO_4$ and the lithium-containing transition metal oxide. As a result, intercalation and deintercalation of lithium smoothly take place.

The ratio a/b of the mass a of the lithium-containing transition metal oxide and the mass b of the compound represented by $LiVOPO_4$ may be in a range of $1.22 \le a/b \le 199$.

In this configuration, higher rate performance can be obtained. This is inferred to be due to the following reasons. That is, the above configuration allows for a sufficient amount of supply of vanadium ion for charge compensation. In addition, production of an electrolytic solution degradation product due to excessive elution of vanadium ion and ease of valence variation can be suppressed.

Moreover, the ratio a/b of the mass a of the lithium-containing transition metal oxide and the mass b of the compound represented by $LiVOPO_4$ may be in a range of $1.5 \le a/b \le 99$ or a range of $4 \le a/b \le 19$. In this configuration, even higher rate performance can be achieved.

The lithium-containing transition metal oxide may be in the form of secondary particles. In this configuration, even higher rate performance can be obtained.

The lithium-containing transition metal oxide may be in the form of spherical secondary particles. In this configuration, even higher rate performance can be obtained.

A secondary particle diameter r of the lithium-containing transition metal oxide may be not less than 3 μm and not more than 100 μm.

In this configuration, high rate performance and thermal stability can be obtained. This is inferred to be due to the following reasons. That is, in the above configuration, excessive contact of the lithium-containing transition metal oxide and the electrolytic solution is suppressed, so that their reaction is suppressed. In addition, the distance between the lithium-containing transition metal oxides is kept short. Accordingly, intercalation and deintercalation of lithium quickly take place.

The secondary particle diameter r of the lithium-containing transition metal oxide may be not less than 5 μm and not more than 50 or not less than 5 μm and not more than 30 μm. In this configuration, even higher rate performance can be achieved.

The compound represented by $LiVOPO_4$ may coat the secondary particles of the lithium-containing transition metal oxide and may be filled between the primary particles at least on the surface of the secondary particles.

In this configuration, even higher rate performance and thermal stability can be obtained. This is inferred to be due to the following reasons. That is, in the compound represented by $LiVOPO_4$, oxygen release due to reaction with the electrolytic solution is small even at elevated temperature. The compound represented by $LiVOPO_4$ thus suppresses excessive contact of the lithium-containing transition metal oxide and the electrolytic solution, thereby suppressing their reaction. In addition, an auxiliary effect of interface charge compensation due to vanadium ion valence variation is sufficiently obtained. Accordingly, smooth lithium intercalation and deintercalation take place.

A primary particle diameter s of the compound represented by $LiVOPO_4$ may be not less than 30 nm and not more than 2.3 μm.

In this configuration, even higher rate performance can be obtained. This is inferred to be due to the following reasons. That is, in the above configuration, the distance between the compounds represented by $LiVOPO_4$ is kept short. Accordingly, intercalation and deintercalation of lithium quickly take place.

The primary particle diameter s of the compound represented by $LiVOPO_4$ may be not less than 50 nm and not more than 2 or may be not less than 300 nm and not more than 0.5 μm. In this configuration, even higher rate performance can be achieved.

Small particles of the compound represented by $LiVOPO_4$ may be present more between the primary particles of the lithium-containing transition metal oxide than on the secondary particle surface thereof.

In this configuration, even higher rate performance can be obtained. This is inferred to be due to an increase in electrolytic solution diffusivity caused by the capillary phenomenon between the small particles of the compound represented by $LiVOPO_4$.

The positive electrode may contain a carbon material. In addition, the ratio c/d of the combined mass c of the lithium-containing transition metal oxide and the compound represented by $LiVOPO_4$ to the mass d of the carbon material may be in a range of $4 \leq c/d \leq 99$.

In this configuration, even higher rate performance can be obtained. This is inferred to be due to an increase in output performance caused by the formation of an electron conduction network in the positive electrode.

According to the present disclosure, a positive electrode and a lithium ion secondary battery that have excellent thermal stability and high rate performance are provided.

In the following, a preferred embodiment of the present disclosure will be described with reference to the drawings. It should be noted, however, that the technology of the present disclosure is not limited to the following embodiment. The constituent elements described below include those that a person skilled in the art could readily conceive of, and those substantially identical thereto. The constituent elements described below may be combined as appropriate.

<Lithium Ion Secondary Battery>

In the following, the constituent members will be described in detail with reference to a lithium ion secondary battery by way of example. FIG. 1 is a schematic cross sectional view of the lithium ion secondary battery according to the present embodiment. As illustrated in FIG. 1, the lithium ion secondary battery 100 is provided with a positive electrode 20; a negative electrode 30 opposing the positive electrode 20; a separator 10; and an electrolytic solution (not illustrated) with which at least the separator is impregnated. The separator 10 is interposed between the positive electrode 20 and the negative electrode 30, and is in contact with a major surface of the positive electrode 20 and a major surface of the negative electrode 30.

The lithium ion secondary battery 100 is mainly provided with a power generating element 40; a case 50 that houses the power generating element 40 in sealed state; and a pair of leads 60, 62 connected to the power generating element 40.

In the power generating element 40, the pair of the positive electrode 20 and the negative electrode 30 is disposed opposing each other across the battery separator 10. The positive electrode 20 is provided with a sheet (film) of positive electrode current collector 22, and a positive electrode active material layer 24 disposed on the positive electrode current collector 22. The negative electrode 30 is provided with a sheet (film) of negative electrode current collector 32, and a negative electrode active material layer 34 disposed on the negative electrode current collector 32. The major surface of the positive electrode active material layer 24 and the major surface of the negative electrode active material layer 34 are respectively in contact with major surfaces of the battery separator 10. The leads 62, 60 are respectively connected to ends of the positive electrode current collector 22 and the negative electrode current collector 32. Ends of the leads 60, 62 extend to the outside of the case 50.

In the power generating element 40, the positive electrode 20 and the negative electrode 30 may be wound spirally, folded, or overlapping each other with the separator 10 interposed therebetween.

Hereafter, the positive electrode 20 and the negative electrode 30 may be generally referred to as electrodes 20, 30. The positive electrode current collector 22 and the negative electrode current collector 32 may be generally referred to as current collectors 22, 32. The positive electrode active material layer 24 and the negative electrode active material layer 34 may be generally referred to as active material layers 24, 34.

<Positive Electrode>

The positive electrode current collector 22 is an electrically conductive sheet material, for example. As the positive electrode current collector 22, a metal thin plate of aluminum, copper, or nickel foil may be used.

The positive electrode active material layer 24 is mainly composed of a positive electrode active material, a binder, and a required amount of conductive auxiliary agent.

The positive electrode 20 according to one aspect of the present disclosure is provided with the positive electrode current collector 22, and the positive electrode active material layer 24 disposed on the positive electrode current collector 22. The positive electrode active material layer 24 contains, as the positive electrode active material, a lithium-containing transition metal oxide represented by composition formula (1) indicated below, and a compound represented by LiVOPO$_4$. The lithium-containing transition metal oxide and the compound represented by LiVOPO$_4$ are dispersed in the positive electrode active material layer 24.

$$\text{Li}_t\text{Ni}_x\text{Co}_y\text{Al}_z\text{O}_2 \quad (1)$$

where $0.9 \leq t \leq 1.1$, $0.3 < x < 0.99$, $0.01 < y < 0.4$, $0.001 < z < 0.2$, and $x+y+z=1$.

In this configuration, high rate performance can be obtained. This is inferred to be due to the following reasons. That is, vanadium ions in the compound represented by LiVOPO$_4$ experience valence variation. This helps charge compensation of the interface of the compound represented by LiVOPO$_4$ and the lithium-containing transition metal oxide. As a result, intercalation and deintercalation of lithium smoothly take place.

That the compound and metal oxide are dispersed in the positive electrode active material layer 24 means a state, observed by element mapping using an electron probe micro analyzer (EPMA) with respect to a cross section of the positive electrode active material, in which the compound and the metal oxide are uniformly distributed in the positive electrode active material layer 24.

The composition ratios of the elements constituting the lithium-containing transition metal oxide and the compound represented by LiVOPO$_4$ are not limited to the above-described composition. For example, similarly high rate performance can be obtained when a different element is included by approximately 3%, or when the composition ratios of the elements are somewhat different.

The composition ratios of the elements can be calculated by determining the contents of the constituent elements by inductively coupled plasma mass spectrometry (ICP-MS) method.

The crystal form of the compound represented by LiVOPO$_4$ is not particularly limited. Part of the compound represented by LiVOPO$_4$ may be in amorphous state. In particular, the crystal form of the compound represented by LiVOPO$_4$ may be in the orthorhombic crystal system.

The crystal form can be identified by X-ray diffraction method, for example.

The ratio a/b of the mass a of the lithium-containing transition metal oxide and the mass b of the compound represented by LiVOPO$_4$ may be in a range of $1.22 \leq a/b \leq 199$.

In this configuration, even higher rate performance can be obtained. This is inferred to be due to the following reasons. That is, the above configuration allows for a sufficient amount of supply of vanadium ion for charge compensation. In addition, production of an electrolytic solution degradation product due to excessive elution of vanadium ion and ease of valence variation can be suppressed.

The ratio a/b of the mass a of the lithium-containing transition metal oxide and the mass b of the compound represented by LiVOPO$_4$ may be in a range of $1.5 \leq a/b \leq 99$ or a range of $4 \leq a/b \leq 19$. In this configuration, even higher rate performance can be achieved.

The ratio a/b of the mass a of the lithium-containing transition metal oxide and the mass b of the compound represented by LiVOPO$_4$ may be determined by X-ray diffraction (XRD) method, X-ray fluorescence (XRF) method, inductively coupled plasma atomic emission spectroscopy (ICP-AES) method, the aforementioned ICP-MS method and the like.

The lithium-containing transition metal oxide may be in the form of secondary particles. In this configuration, even higher rate performance can be obtained.

The lithium-containing transition metal oxide may be in the form of spherical secondary particles. In this configuration, even higher rate performance can be obtained.

A secondary particle diameter r of the lithium-containing transition metal oxide may be not less than 3 μm and not more than 100 μm.

In this configuration, high rate performance and thermal stability can be obtained. This is inferred to be due to the following reasons. That is, in the above configuration, excessive contact of the lithium-containing transition metal oxide and the electrolytic solution is suppressed, so that their reaction is suppressed. In addition, the distance between the lithium-containing transition metal oxides is kept short. Accordingly, intercalation and deintercalation of lithium quickly take place.

The secondary particle diameter r of the lithium-containing transition metal oxide may be not less than 5 μm and not more than 50 or not less than 5 μm and not more than 30 μm. In this configuration, even higher rate performance can be achieved.

The compound represented by LiVOPO$_4$ may coat the secondary particles of the lithium-containing transition metal oxide and may be filled between the primary particles at least on the surface of the secondary particles.

In this configuration, even higher rate performance and thermal stability can be obtained. This is inferred to be due to the following reasons. That is, in the compound represented by LiVOPO$_4$, oxygen release due to reaction with the electrolytic solution is small even at elevated temperature. The compound represented by LiVOPO$_4$ thus suppresses excessive contact of the lithium-containing transition metal oxide and the electrolytic solution, thereby suppressing their reaction. In addition, an auxiliary effect of interface charge compensation due to vanadium ion valence variation is sufficiently obtained. Accordingly, smooth lithium intercalation and deintercalation take place.

The state of coating of the compound represented by LiVOPO$_4$ on the lithium-containing transition metal oxide secondary particles, the state of filling of the same between the primary particles and the like can be observed by the following method, for example. First, the positive electrode 20 is cut, and the cutting cross-section is polished using a cross section polisher and/or an ion milling device and the like. The cutting cross-section after polishing is observed using a scanning electron microscope (SEM) and/or a transmission electron microscope (TEM), for example.

Figure 2:
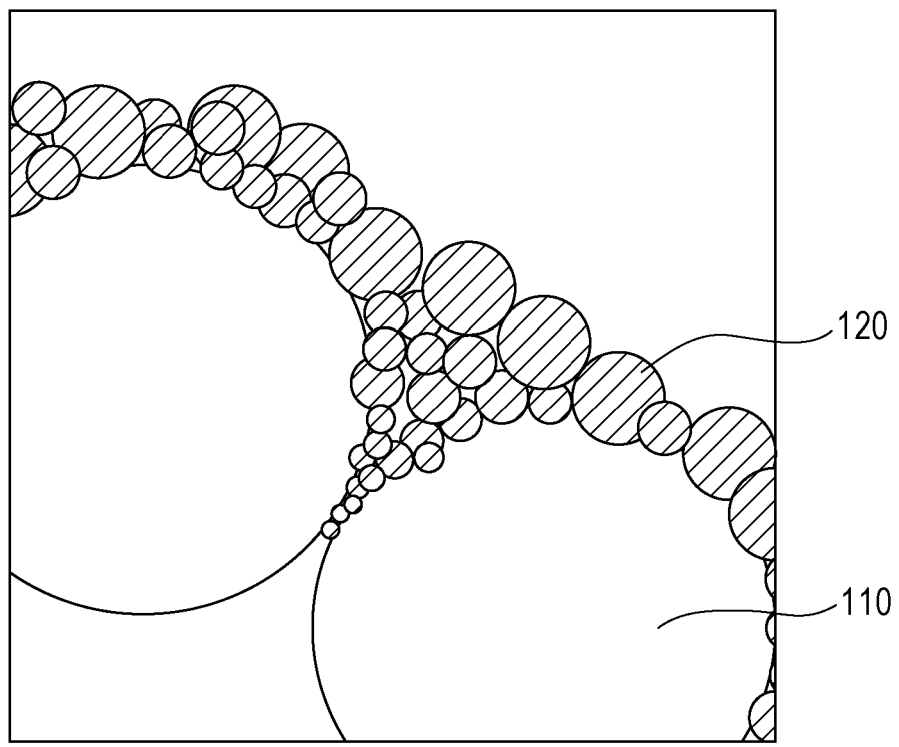
FIG. 2 is a schematic cross sectional view taken in the vicinity of the surface of positive electrode active material particles contained in a positive electrode according to the present embodiment.

FIG. 2 illustrates an example of the state in the vicinity of the surface of the positive electrode active material particles contained in the positive electrode 20 according to the present embodiment. Of course, the state in the vicinity of the surface of the positive electrode active material particles is not limited to the state illustrated in FIG. 2. As illustrated in FIG. 2, the compound 120 represented by LiVOPO$_4$ coats the lithium-containing transition metal oxide secondary particles and may also be filled between the primary particles 110 at least on the surface of the secondary particles.

A primary particle diameter s of the compound represented by LiVOPO4 may be not less than 30 nm and not more than 2.3 μm.

In this configuration, even higher rate performance can be obtained. This is inferred to be due to the following reasons. That is, in the above configuration, the distance between the compounds represented by LiVOPO$_4$ is kept short. Accordingly, intercalation and deintercalation of lithium quickly take place.

The primary particle diameter s of the compound represented by LiVOPO$_4$ may be not less than 50 nm and not more than 2 or may be not less than 300 nm and not more than 0.5 μm. In this configuration, even higher rate performance can be achieved.

In the present embodiment, the secondary particle diameter r and the primary particle diameter s are the particle diameters defined in terms of fixed-direction diameters in a SEM photograph. The secondary particle diameter r may be determined by measuring the fixed-direction diameters of 100 to 400 secondary particles in a SEM photograph, and then determining an average value of a cumulative distribution of the measured fixed-direction diameters. The primary particle diameter s may be similarly determined by measuring the fixed-direction diameters of 100 to 400 primary particles in a SEM photograph, and then determining an average value of a cumulative distribution of the measured fixed-direction diameters.

Small particles of the compound represented by LiVOPO$_4$ may be present more between the primary particles of the lithium-containing transition metal oxide than on the secondary particle surface thereof.

In this configuration, even higher rate performance can be obtained. This is inferred to be due to an increase in electrolytic solution diffusivity caused by the capillary phenomenon between the small particles of the compound represented by LiVOPO$_4$.

The positive electrode 20 of the present embodiment may contain a carbon material. In addition, the ratio c/d of the combined mass c of the lithium-containing transition metal oxide and the compound represented by LiVOPO$_4$ to the mass d of the carbon material may be in a range of $4 \leq c/d \leq 99$.

In this configuration, even higher rate performance can be obtained. This is inferred to be due to an increase in output performance caused by the formation of an electron conduction network in the positive electrode 20.

Examples of the carbon material include graphite, carbon black, acetylene black, Ketjen black, and carbon fiber. By using such carbon material, conductivity of the positive electrode active material layer 24 can be improved.

<Conductive Auxiliary Agent>

The conductive auxiliary agent is not particularly limited and may be a known conductive auxiliary agent as long as it increases the conductivity of the positive electrode active material layer 24. Examples of the conductive auxiliary agent include carbon black such as acetylene black, furnace black, channel black, and thermal black; carbon fibers such as vapor-grown carbon fiber (VGCF), and carbon nanotubes; and carbon material such as graphite. As the conductive auxiliary agent, one or more of the above examples may be used.

The content of the conductive auxiliary agent in the positive electrode active material layer 24 is also not particularly limited. When the conductive auxiliary agent is added into the positive electrode active material layer 24, the content of the conductive auxiliary agent may normally be 1 mass % to 10 mass % with reference to the sum of the masses of the positive electrode active material, the conductive auxiliary agent, and the binder.

(Binder)

The binder binds the active materials and also binds the active materials with the current collector 22. The binder may be any binder capable of achieving the above binding. Examples of the binder include fluorine resin such as polyvinylidene fluoride (PVDF), polytetrafluoroethylene (PTFE), tetrafluoroethylene/hexafluoropropylene copolymer (FEP), tetrafluoroethylene/perfluoro alkyl vinyl ether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF).

Other than the above examples, vinylidene fluoride fluorine rubber may be used as the binder. Examples of fluorine rubber based on vinylidene fluoride include fluorine rubber based on vinylidene fluoride/hexafluoropropylene (VDF/HFP-based fluorine rubber), fluorine rubber based on vinylidene fluoride/hexafluoropropylene/tetrafluoroethylene (VDF/HFPTFE-based fluorine rubber), fluorine rubber based on vinylidene fluoride/pentafluoropropylene (VDF/PFP-based fluorine rubber), fluorine rubber based on vinylidene fluoride/pentafluoropropylene/tetrafluoroethylene (VDF/PFP/TFE-based fluorine rubber), fluorine rubber based on vinylidene fluoride/perfluoromethyl vinyl ether/tetrafluoroethylene (VDF/PFMVE/TFE-based fluorine rubber), and fluorine rubber based on vinylidene fluoride/chlorotrifluoroethylene (VDF/CTFE-based fluorine rubber).

In addition to the above, examples of the binder that may be used include polyethylene, polypropylene, polyethylene terephthalate, aromatic polyamide, cellulose, styrene-butadiene rubber, isoprene rubber, butadiene rubber, and ethylene-propylene rubber. Other examples of the binder that may be used include thermoplastic elastomeric polymers such as styrene-butadiene-styrene block copolymers, hydrogen additives thereof, styrene-ethylene-butadiene-styrene copolymers, styrene-isoprene-styrene block copolymers, and hydrogen additives thereof. Yet other examples of the binder that may be used include syndiotactic 1,2-polybutadiene, ethylene-vinyl acetate copolymers, and propylene/α-olefin (having a carbon number of 2 to 12) copolymers.

As the binder, a conductive polymer having electron conductivity or a conductive polymer having ion conductivity may be used. An example of the conductive polymer having electron conductivity is polyacetylene.

As the conductive polymer having ion conductivity, a conductive polymer having ion conductivity with respect to lithium ion and the like may be used, for example. An example of the conductive polymer is a complex of a polymer compound monomer and a lithium salt or an alkali metal salt composed mainly of lithium. Examples of the monomer include polyether-based polymer compounds such as polyethylene oxide and polypropylene oxide; crosslinked polymers of polyether compounds; polyepichlorohydrin; polyphosphazene; polysiloxane; polyvinylpyrrolidone; polyvinylidene carbonate; and polyacrylonitrile. Examples of the lithium salt or alkali metal salt composed mainly of lithium include LiClO$_4$, LiBF$_4$, LiPF$_6$, LiAsF$_6$, LiCl, LiBr, Li(CF$_3$SO$_2$)$_2$N, and LiN(C$_2$F$_5$SO$_2$)$_2$. Examples of the polymerization initiator used for complexing include photopolymerization initiators or thermal polymerization initiators adapted for the monomer.

The binder content in the positive electrode active material layer 24 is not particularly limited. The binder content may be 1 mass % to 15 mass % or 3 mass % to 10 mass % with reference to the sum of the masses of the active material, the conductive auxiliary agent, and the binder. When the binder content in the positive electrode active material layer 24 is in the above ranges, it becomes possible to suppress the tendency of failure to form a strong active material layer due to too little an amount of the binder in the obtained electrode active material layer 24. It also becomes possible to suppress the tendency of difficulty in obtaining a sufficient volume energy density due to an increase in the amount of binder that does not contribute to electric capacity.

<Negative Electrode>

The negative electrode current collector 32 is an electrically conductive sheet material, for example. Examples of the material of the negative electrode current collector 32 include metal thin plates of aluminum, copper, and nickel foils.

The negative electrode active material layer 34 is mainly composed of a negative electrode active material, a binder, and a required amount of conductive auxiliary agent.

The negative electrode active material is not particularly limited as long as it is capable of reversibly proceeding absorption and desorption of lithium ion, intercalation and deintercalation of lithium ion, or doping and undoping of lithium ion and counter anion of the lithium ion (for example, $ClO_4^-$). As the negative electrode active material, known negative electrode active materials used in lithium ion secondary batteries may be used. Examples of the negative electrode active material include carbon materials such as natural graphite, synthetic graphite, mesocarbon micro beads, mesocarbon fiber (MCF), coaks, glasslike carbon, and organic compound fired material; metals that can be combined with lithium, such as Al, Si, and Sn; amorphous compounds composed mainly of oxides such as $SiO_2$ and $SnO_2$; and lithium titanate ($Li_4Ti_5O_{12}$).

As the binder and conductive auxiliary agent, the same material as the aforementioned material used for the binder in the positive electrode 20 may be used. As to the binder content too, the same content as the aforementioned binder content in the positive electrode 20 may be adopted.

<Separator>

The separator 10 may be formed from a material that has electrically insulating porous structure. Examples of the material include a single-layer body or a stacked body of polyethylene, polypropylene or polyolefin films; an extended film of a mixture of the aforementioned resins; and a fibrous nonwoven fabric including at least one constituent material selected from the group consisting of cellulose, polyester, and polypropylene.

<Electrolyte Solution>

The electrolytic solution is contained in the positive electrode active material layer 24, the negative electrode active material layer 34, and the battery separator 10. The electrolytic solution is not particularly limited. For example, in the present embodiment, an electrolytic solution (such as electrolytic aqueous solution and electrolytic solution using organic solvent) containing lithium salt may be used. However, in the case of electrolytic aqueous solution, the electrochemical decomposition voltage is low, and the withstand voltage at the time of charging is limited to a low voltage. Accordingly, the electrolytic solution may be an electrolytic solution that contains organic solvent (nonaqueous electrolytic solution). The electrolytic solution that is used may be obtained by dissolving lithium salt in a nonaqueous solvent (organic solvent). Examples of the lithium salt that may be used include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. The salts may be used individually or in a combination of two or more salts.

Examples of the organic solvent include propylene carbonate, ethylene carbonate, and diethyl carbonate. The organic solvents may be used individually or in a mixture of two or more organic solvents mixed in any desired ratio.

<Case>

The case 50 encases the power generating element 40 and the electrolytic solution in a sealed manner. The case 50 is not particularly limited as long as it is capable of reducing leakage of electrolytic solution to the outside, intrusion of water and the like into the lithium ion secondary battery 100 from the outside, and the like. For example, as the case 50, as illustrated in FIG. 1, a metal laminate film including a metal foil 52 and a polymer film 54 coating the metal foil 52 on both sides may be utilized. For example, an aluminum foil may be used as the metal foil 52, and a film of polypropylene and the like may be used as the polymer film 54. For example, the material of the outer polymer film 54 may be a polymer with a high melting point, such as polyethylene terephthalate (PET) and polyamide. The material of the inner polymer film 54 may be polyethylene (PE), polypropylene (PP) and the like.

<Leads>

The leads 60, 62 are formed from a conductive material such as aluminum and nickel.

<Lithium Ion Secondary Battery Manufacturing Method>

The lithium ion secondary battery 100 may be manufactured as described below. First, the leads 62, 60 are respectively welded onto the positive electrode current collector 22 and the negative electrode current collector 32 by known method. Between the positive electrode active material layer 24 of the positive electrode 20 and the negative electrode active material layer 34 of the negative electrode 30, the battery separator 10 is interposed. In this state, the positive electrode 20, the negative electrode 30, and the battery separator 10 are inserted into the case 50 together with the electrolytic solution, and then the entry of the case 50 is sealed.

<Method for Manufacturing Lithium Ion Secondary Battery Electrodes>

The electrodes 20, 30 may be fabricated by a method normally used, as follows. First, a paint including active material, binder, solvent, and conductive auxiliary agent is coated on the current collectors. Thereafter, the solvent in the paint with which the current collectors have been coated is removed.

Examples of the solvent that may be used include N-methyl-2-pyrrolidone and N,N-dimethylformamide.

The coating method is not particularly limited, and a method normally adopted for electrode fabrication may be used. Examples of the coating method include slit die-coating method and doctor blade method.

The method for removing the solvent from the paint with which the current collectors 22, 32 are coated is not particularly limited. In order to remove the solvent, the current collectors 22, 32 with the paint coated thereon are dried in an atmosphere of 80° C. to 150° C., for example.

The electrodes on which the active material layers 24, 34 have been formed as described above may then be subjected to a press process as needed, using a roll press device and the like, for example. The linear pressure of the roll press may be 100 to 1500 kgf/cm, for example.

Through the above steps, the electrodes 20, 30 can be fabricated.

<Method for Manufacturing Positive Electrode Active Material>

A method for manufacturing the positive electrode active material will be described.

The method for manufacturing the lithium-containing transition metal oxide represented by composition formula (1) is not particularly limited. The manufacturing method includes at least a raw-material preparation step and a firing step. The raw-material preparation step may include, for example, compounding a predetermined lithium source and metal source so that the molar ratio according to composition formula (1) is satisfied, followed by pulverizing/mixing, thermal decomposition/mixing, precipitation reaction, or hydrolysis.

The method for manufacturing the compound represented by $LiVOPO_4$ is not particularly limited. The manufacturing method includes at least a raw-material preparation step and a firing step. In the raw-material preparation step, a lithium source, a vanadium source, a phosphorus source, and water are stirred and mixed to prepare a mixture (liquid mixture). A drying step of drying the mixture obtained in the raw-material preparation step may be implemented before the firing step. As needed, a hydrothermal synthesis step may be implemented before the drying step and the firing step.

The compounding ratios of the lithium source, vanadium source and phosphorus source are adjusted by, for example, making the molar ratios of Li, V, and P in the mixture correspond to the stoichiometric proportion (1:1:1) of $LiVOPO_4$. The compound represented by $LiVOPO_4$ may be manufactured by drying and firing the mixture. The lithium amount of the $LiVOPO_4$ can be adjusted by causing electric chemical deintercalation of Li from the obtained $LiVOPO_4$.

Alternatively, the compound represented by $LiVOPO_4$ may be manufactured by subjecting $VOPO_4$ and a lithium source to a mixing and heating treatment. $VOPO_4$ may be manufactured as described below, for example. A phosphorus source, a vanadium source, and distilled water are stirred to prepare a mixture thereof. The mixture is dried to manufacture $VOPO_4 \cdot 2H_2O$ which is a hydrate. $VOPO_4 \cdot 2H_2O$ is further subjected to a heat treatment to manufacture $VOPO_4$.

The compound form of the metal source, lithium source, vanadium source, and phosphorus source is not particularly limited. Depending on the process, known material such as oxides and salts of the individual raw-materials may be selected.

In order to obtain a powder of active material that has a desired particle diameter, a pulverizer or a classifier may be used. Examples of the pulverizer and classifier include a mortar, a ball mill, a bead mill, a sand mill, a vibration ball mill, a planetary ball mill, a jet mill, a counter-jet mill, a swirling-airflow jet mill, and a sieve. For pulverization, wet pulverizing using water or an organic solvent such as hexane may be used. The classification method is not particularly limited. For both dry pulverizing and wet pulverizing, a sieve, a wind power classifier and the like may be used as needed.

For manufacturing the positive electrode active material, the lithium-containing transition metal oxide represented by composition formula (1) and the compound represented by $LiVOPO_4$ are weighed at predetermined ratios and mixed as needed. The mixing method is not particularly limited. For the mixing, a known device may be used. Specifically, a powder mixer such as a mortar, a V-type mixer, a S-type mixer, an automated mortar, a ball mill, or a planetary ball mill may be used for dry or wet mixing.

The method for manufacturing the positive electrode active material may include a step of attaching or coating a surface of the lithium-containing transition metal oxide represented by composition formula (1) with the compound represented by $LiVOPO_4$. The method for forming the coating layer is not particularly limited. As the method, an existing method for forming a coating layer on a particle surface may be used, such as a mechanochemical method utilizing mechanical energy of friction or compression, or a spray dry method of spraying a coating liquid onto the particle.

In addition, in the present embodiment, the positive electrode active material for lithium ion secondary battery obtained by the mixing method may be fired in an argon atmosphere, an air atmosphere, an oxygen atmosphere, a nitrogen atmosphere, or a mixed atmosphere thereof.

The firing temperature is not particularly limited and may be a temperature such that the lithium-containing transition metal oxide represented by composition formula (1) or the compound represented by $LiVOPO_4$ is not altered or decomposed. For example, the firing temperature is in a range of from 100° C. to 650° C.

In the foregoing, a preferred embodiment of the positive electrode and lithium ion secondary battery according to the present embodiment has been described in detail. However, the technology of the present disclosure is not limited to the embodiment.

EXAMPLES

In the following, the technology of the present disclosure will be described in more concrete terms with reference to examples and comparative examples. The technology of the present disclosure, however, is not limited to the following examples.

Example 1

(1) Fabrication of Positive Electrode

For fabricating the positive electrode active material, as the lithium-containing transition metal oxide represented by composition formula (1), $Li_{1.01}Ni_{0.83}Co_{0.13}Al_{0.03}O_2$ (spherical secondary particles with a secondary particle diameter of 20 μm) was used. In addition, as the compound represented by $LiVOPO_4$, $LiVOPO_4$ in the orthorhombic crystal system was used. The $Li_{1.01}Ni_{0.83}Co_{0.13}O_2$ and $LiVOPO_4$ were weighed at a mass ratio of 80:20 and mixed using a mortar to fabricate the positive electrode active material. Then, 90 parts by mass of a powder of the positive electrode active material, 5 parts by mass of acetylene black, and 5 parts by mass of polyvinylidene fluoride (PVDF) were dispersed in N-methyl-2-pyrrolidone (NMP), thereby preparing a slurry. The obtained slurry was coated on an aluminum foil with a thickness of 20 μm. The aluminum foil with the slurry coated thereon was dried at a temperature of 140° C. for 30 minutes, and then subjected to a press process at a linear pressure of 1000 kgf/cm using a roll press device. In this way, the positive electrode was obtained.

(2) Fabrication of Negative Electrode

Ninety parts by mass of a natural graphite powder as the negative electrode active material and 10 parts by mass of PVDF were dispersed in NMP, thereby preparing a slurry. The obtained slurry was coated on a copper foil with a thickness of 15 μm. The copper foil with the slurry coated thereon was dried at reduced pressure at a temperature of 140° C. for 30 minutes, and was then subjected to a press process using a roll press device. In this way, the negative electrode was obtained.

(3) Nonaqueous Electrolytic Solution

Into a mixed solvent of ethylene carbonate (EC) and diethyl carbonate (DEC), $LiPF_6$ was dissolved to achieve 1.0 mol/L, thereby obtaining a nonaqueous electrolytic solution. The volume ratio of EC and DEC in the mixed solvent was EC:DEC=30:70.

(4) Separator

A microporous polyethylene film (pore ratio: 40%, shutdown temperature: 134° C.) with a film thickness of 20 μm was prepared.

(5) Fabrication of Battery

Four sheets of the negative electrode and three sheets of the positive electrode fabricated as described above were prepared. The negative electrode and positive electrode sheets were alternately laminated via six sheets of the separator, thereby forming the power generating element. In addition, to a protruding end of the copper foil of the negative electrode of the power generating element which is not provided with the negative electrode active material layer, a nickel negative electrode lead was attached. On the other hand, to a protruding end of the aluminum foil of the positive electrode of the power generating element which is not provided with the positive electrode active material layer, an aluminum positive electrode leads was attached using a ultrasonic welder. The power generating element was then inserted into a case formed from an aluminum laminate film. The case was heat-sealed except for one location in a periphery thereof, forming a closed opening. Into the case, the nonaqueous electrolytic solution was injected. Thereafter, the remaining one location was hermetically sealed by heat seal while reducing pressure with a vacuum sealing machine. In this way, a battery cell serving as the lithium ion secondary battery according to Example 1 was fabricated.

(Measurement of Rate Performance)

Next, using the battery cell of Example 1 fabricated as described above, charging was performed with a constant current density of 0.5 C until the charge cut-off voltage became 4.2 V (vs.Li/Li$^+$). Further, constant-voltage charging was performed with a constant-voltage of 4.2 V (vs.Li/Li$^+$) until the current density decreased to 0.05 C. After a 10-minute pause, discharging was performed with a constant current density of 0.5 C until the discharge cut-off voltage became 2.8 V (vs.Li/Li$^+$). Thereafter, the discharge capacity of the battery at 0.5 C was measured.

Similarly, charging was performed with a constant current density of 0.5 C until the charge cut-off voltage became 4.2 V (vs.Li/Li$^+$). Further, constant-voltage charging was performed with a constant voltage of 4.2 V (vs.Li/Li$^+$) until the current density decreased to 0.05 C. After a 10-minute pause, discharging was performed with a constant current density of 3 C until the discharge cut-off voltage became 2.8 V (vs.Li/Li$^+$). Thereafter, the discharge capacity of the battery at 3 C was measured.

The ratio of the discharge capacity at 0.5 C to the discharge capacity at 3 C measured as described above was considered the rate performance. The rate performance is represented by the following mathematical expression (1). With regard to current density, 1 C per weight of the positive electrode active material was assumed to be 180 mAh/g when the rate performance was measured.

$$\text{Rate performance}(\%)=(0.5\ C/3\ C\ \text{discharge capacity})/(0.5\ C/0.5\ C\ \text{discharge capacity})\times 100 \quad (1)$$

It was assumed that 1 C per weight of the lithium-containing transition metal oxide was 190 mAh/g, and that 1 C per weight of the compound represented by $LiVOPO_4$ was 140 mAh/g. Based on these assumptions, the current density is determined by the weight ratios of the lithium-containing transition metal oxide and the compound represented by $LiVOPO_4$ in the positive electrode active material.

A high rate performance means that the characteristics of the lithium ion secondary battery are satisfactory. The rate performance of the lithium ion secondary batteries fabricated in the examples and comparative examples was evaluated using the above condition. The evaluation results are shown in Table 1.

(Measurement of Particle Diameter)

In the examples and comparative examples, the secondary particle diameter of the lithium-containing transition metal oxide and the primary particle diameter s of the compound represented by $LiVOPO_4$ are particle diameters defined using fixed-direction diameters in a SEM photograph. The particle diameters are obtained by measuring the fixed-direction diameters of 100 secondary particles or 100 primary particles in a SEM photograph, and then determining average values of the cumulative distributions thereof. The results are shown in Table 1.

(Measurement of Mass)

The mass of the lithium-containing transition metal oxide and the mass of the compound represented by $LiVOPO_4$ were quantitatively determined by the XRD method using the positive electrodes according to the examples and comparative examples. The results are shown in Table 1. In each of the examples and comparative examples, the mass ratio at the time of weighing (i.e., the value of (mass a of lithium-containing transition metal oxide)/(mass b of the compound represented by $LiVOPO_4$)) agreed with the value determined from the quantitative value obtained by the XRD method.

Comparative Example 1

During the fabrication of the positive electrode, as the lithium-containing transition metal oxide, $LiCoO_2$ was used instead of $Li_{1.01}Ni_{0.83}Co_{0.13}O_2$. In addition, with regard to the current density at the time of rate performance measurement, 1 C per weight of the positive electrode active material was 156 mAh/g. With the exception of the above, a battery cell was fabricated and evaluated by the same method as in Example 1.

Comparative Example 2

The battery cell was fabricated and evaluated by the same method as in Example 1 with the exception that, during the fabrication of the positive electrode, instead of the compound represented by $LiVOPO_4$, $LiFePO_4$ was used.

Comparative Example 3

The battery cell was fabricated and evaluated by the same method as in Example 1 with the exception that, during the fabrication of the positive electrode, instead of the compound represented by $LiVOPO_4$, $LiCoPO_4$ was used.

Comparative Example 4

The battery cell was fabricated and evaluated by the same method as in Example 1 with the exception that, during the fabrication of the positive electrode, instead of the compound represented by $LiVOPO_4$, $LiMnPO_4$ was used.

Comparative Example 5

The battery cell was fabricated and evaluated by the same method as in Example 1 with the exception that, during the fabrication of the positive electrode, instead of the compound represented by LiVOPO$_4$, LiNiPO$_4$ was used.

Example 2

During the fabrication of the positive electrode, the ratio a/b of the mass a of the lithium-containing transition metal oxide to the mass b of the compound represented by LiVOPO$_4$ was 1. In addition, with regard to the current density at the time of rate performance measurement, 1 C per weight of the positive electrode active material was 165 mAh/g. With the exception of the above, a battery cell was fabricated and evaluated by the same method as in Example 1.

Example 3

During the fabrication of the positive electrode, the ratio a/b of the mass a of the lithium-containing transition metal oxide to the mass b of the compound represented by LiVOPO$_4$ was 1.22. In addition, with regard to the current density at the time of rate performance measurement, 1 C per weight of the positive electrode active material was 168 mAh/g. With the exception of the above, a battery cell was fabricated and evaluated by the same method as in Example 1.

Example 4

During the fabrication of the positive electrode, the ratio a/b of the mass a of the lithium-containing transition metal oxide to the mass b of the compound represented by LiVOPO$_4$ was 1.5. In addition, with regard to the current density at the time of rate performance measurement, 1 C per weight of the positive electrode active material was 170 mAh/g. With the exception of the above, a battery cell was fabricated and evaluated by the same method as in Example 1.

Example 5

During the fabrication of the positive electrode, the ratio a/b of the mass a of the lithium-containing transition metal oxide to the mass b of the compound represented by LiVOPO$_4$ was 2.33. In addition, with regard to the current density at the time of rate performance measurement, 1 C per weight of the positive electrode active material was 175 mAh/g. With the exception of the above, a battery cell was fabricated and evaluated by the same method as in Example 1.

Example 6

During the fabrication of the positive electrode, the ratio a/b of the mass a of the lithium-containing transition metal oxide to the mass b of the compound represented by LiVOPO$_4$ was 9. In addition, with regard to the current density at the time of rate performance measurement, 1 C per weight of the positive electrode active material was 185 mAh/g. With the exception of the above, a battery cell was fabricated and evaluated by the same method as in Example 1.

Example 7

During the fabrication of the positive electrode, the ratio a/b of the mass a of the lithium-containing transition metal oxide to the mass b of the compound represented by LiVOPO$_4$ was 19. In addition, with regard to the current density at the time of rate performance measurement, 1 C per weight of the positive electrode active material was 188 mAh/g. With the exception of the above, a battery cell was fabricated and evaluated by the same method as in Example 1.

Example 8

During the fabrication of the positive electrode, the ratio a/b of the mass a of the lithium-containing transition metal oxide to the mass b of the compound represented by LiVOPO$_4$ was 49. In addition, with regard to the current density at the time of rate performance measurement, 1 C per weight of the positive electrode active material was 189 mAh/g. With the exception of the above, a battery cell was fabricated and evaluated by the same method as in Example 1.

Example 9

During the fabrication of the positive electrode, the ratio a/b of the mass a of the lithium-containing transition metal oxide to the mass b of the compound represented by LiVOPO$_4$ was 99. In addition, with regard to the current density at the time of rate performance measurement, 1 C per weight of the positive electrode active material was 190 mAh/g. With the exception of the above, a battery cell was fabricated and evaluated by the same method as in Example 1.

Example 10

During the fabrication of the positive electrode, the ratio a/b of the mass a of the lithium-containing transition metal oxide to the mass b of the compound represented by LiVOPO$_4$ was 199. In addition, with regard to the current density at the time of rate performance measurement, 1 C per weight of the positive electrode active material was 190 mAh/g. With the exception of the above, a battery cell was fabricated and evaluated by the same method as in Example 1.

Example 11

A battery cell was fabricated and evaluated by the same method as in Example 1 with the exception that, during the fabrication of the positive electrode, instead of the lithium-containing transition metal oxide with a secondary particle diameter of 20 μm, the lithium-containing transition metal oxide with a secondary particle diameter of 3 μm was used.

Example 12

A battery cell was fabricated and evaluated by the same method as in Example 1 with the exception that, during the fabrication of the positive electrode, instead of the lithium-containing transition metal oxide with a secondary particle diameter of 20 μm, the lithium-containing transition metal oxide with a secondary particle diameter of 5 μm was used.

Example 13

A battery cell was fabricated and evaluated by the same method as in Example 1 with the exception that, during the fabrication of the positive electrode, instead of the lithium-

Example 14

A battery cell was fabricated and evaluated by the same method as in Example 1 with the exception that, during the fabrication of the positive electrode, instead of the lithium-containing transition metal oxide with a secondary particle diameter of 20 µm, the lithium-containing transition metal oxide with a secondary particle diameter of 30 µm was used.

Example 15

A battery cell was fabricated and evaluated by the same method as in Example 1 with the exception that, during the fabrication of the positive electrode, instead of the lithium-containing transition metal oxide with a secondary particle diameter of 20 µm, the lithium-containing transition metal oxide with a secondary particle diameter of 40 µm was used.

Example 16

A battery cell was fabricated and evaluated by the same method as in Example 1 with the exception that, during the fabrication of the positive electrode, instead of the lithium-containing transition metal oxide with a secondary particle diameter of 20 µm, the lithium-containing transition metal oxide with a secondary particle diameter of 50 µm was used.

Example 17

A battery cell was fabricated and evaluated by the same method as in Example 1 with the exception that, during the fabrication of the positive electrode, instead of the lithium-containing transition metal oxide with a secondary particle diameter of 20 µm, the lithium-containing transition metal oxide with a secondary particle diameter of 60 µm was used.

Example 18

A battery cell was fabricated and evaluated by the same method as in Example 1 with the exception that, during the fabrication of the positive electrode, instead of the lithium-containing transition metal oxide with a secondary particle diameter of 20 µm, the lithium-containing transition metal oxide with a secondary particle diameter of 100 µm was used.

Example 19

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 30 nm was used.

Example 20

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 50 nm was used.

Example 21

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 100 nm was used.

Example 22

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 300 nm was used.

Example 23

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 1000 nm was used.

Example 24

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 1700 nm was used.

Example 25

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 2000 nm was used.

Example 26

A battery cell was fabricated and evaluated by the same method as in Example 1 with the exception that, during the fabrication of the positive electrode, instead of the compound represented by $LiVOPO_4$ with a primary particle diameter of 500 nm, the compound represented by $LiVOPO_4$ with a primary particle diameter of 2300 nm was used.

Example 27

A battery cell was fabricated and evaluated by the same method as in Example 1 with the exception that, during the fabrication of the positive electrode, the positive electrode active material in which the surface of the lithium-containing transition metal oxide with a secondary particle diameter of 20 μm had been coated with the compound represented by $LiVOPO_4$ using mechanochemical method was used. The coating state was observed as follows. First, the positive electrode was cut, and a sample was obtained by polishing the cutting cross-section using a cross section polisher and an ion milling device. The coating state of the sample was observed using a SEM and a TEM. In this way, it was confirmed that the compound represented by $LiVOPO_4$ had formed a coating layer on the surface of the lithium-containing transition metal oxide secondary particles, and had also been filled between the primary particles in the vicinity of the secondary particle surface.

Example 28

A battery cell was fabricated and evaluated by the same method as in Example 1 with the exception that: during the fabrication of the positive electrode, instead of the lithium-containing transition metal oxide with a secondary particle diameter of 20 μm, lithium-containing transition metal oxide with a secondary particle diameter of 5 μm was used; and that the positive electrode active material in which the lithium-containing transition metal oxide surface had been coated with the compound represented by $LiVOPO_4$ by mechanochemical method was used. The coating state was observed as follows. First, the positive electrode was cut, and a sample was obtained by polishing the cutting cross-section using a cross section polisher and an ion milling device. The coating state of the sample was observed using a SEM and a TEM. In this way, it was confirmed that the compound represented by $LiVOPO_4$ had formed a coating layer on the lithium-containing transition metal oxide secondary particle surface, and had also been filled between the primary particles in the vicinity of the secondary particle surface.

Example 29

A battery cell was fabricated and evaluated by the same method as in Example 1 with the exception that: during the fabrication of the positive electrode, instead of the lithium-containing transition metal oxide with a secondary particle diameter of 20 μm, lithium-containing transition metal oxide with a secondary particle diameter of 10 μm was used; and that the positive electrode active material in which the lithium-containing transition metal oxide surface had been coated with the compound represented by $LiVOPO_4$ by mechanochemical method was used. The coating state was observed as follows. First, the positive electrode was cut, and a sample was obtained by polishing the cutting cross-section using a cross section polisher and an ion milling device. The coating state of the sample was observed using a SEM and a TEM. In this way, it was confirmed that the compound represented by $LiVOPO_4$ had formed a coating layer on the lithium-containing transition metal oxide secondary particle surface, and had also been filled between the primary particles in the vicinity of the secondary particle surface.

Example 30

A battery cell was fabricated and evaluated by the same method as in Example 1 with the exception that: during the fabrication of the positive electrode, instead of the lithium-containing transition metal oxide with a secondary particle diameter of 20 μm, lithium-containing transition metal oxide with a secondary particle diameter of 30 μm was used; and that the positive electrode active material in which the lithium-containing transition metal oxide surface had been coated with the compound represented by $LiVOPO_4$ by mechanochemical method was used. The coating state was observed as follows. First, the positive electrode was cut, and a sample was obtained by polishing the cutting cross-section using a cross section polisher and an ion milling device. The coating state of the sample was observed using a SEM and a TEM. In this way, it was confirmed that the compound represented by $LiVOPO_4$ had formed a coating layer on the lithium-containing transition metal oxide secondary particle surface, and had also been filled between the primary particles in the vicinity of the secondary particle surface.

Comparative Example 6

A battery cell was fabricated and evaluated by the same method as in Example 1 with the exception that: during the fabrication of the positive electrode, as the lithium-containing transition metal oxide, $LiCoO_2$ was used instead of $Li_{1.01}Ni_{0.83}Co_{0.13}Al_{0.03}O_2$; that a step of coating the compound represented by $LiVOPO_4$ on the lithium-containing transition metal oxide surface using mechanochemical method was performed; and that, with regard to the current density at the time of rate performance measurement, 1 C per weight of the positive electrode active material was 156 mAh/g. The coating state was observed by the same method as described above. As a result, it was confirmed that the compound represented by $LiVOPO_4$ had formed a coating layer on the lithium-containing transition metal oxide secondary particle surface, and had also been filled between the primary particles in the vicinity of the secondary particle surface.

Comparative Example 7

A battery cell was fabricated and evaluated by the same method as in Example 1 with the exception that, during the fabrication of the positive electrode, $LiFePO_4$ was used instead of the compound represented by $LiVOPO_4$, and that a step of coating $LiFePO_4$ on the lithium-containing transition metal oxide surface by mechanochemical method was performed. The coating state was observed by the same method as described above, and it was confirmed that the compound represented by $LiFePO_4$ had formed a coating layer on the lithium-containing transition metal oxide secondary particle surface, and had also been filled between the primary particles in the vicinity of the secondary particle surface.

The evaluation results of Examples 1 to 30 and Comparative Examples 1 to 7 are shown in Table 1.

TABLE 1

| | Lithium-containing transition metal oxide | Compound represented by LiVOPO$_4$ or olivine compound | a/b | r [μm] | s [nm] | Coating step | Rate performance |
|---|---|---|---|---|---|---|---|
| Example 1 | Li$_{1.01}$Ni$_{0.83}$Co$_{0.13}$Al$_{0.03}$O$_2$ | LiVOPO$_4$ | 4 | 20 | 500 | No | 83.2% |
| Comparative Example 1 | LiCoO$_2$ | LiVOPO$_4$ | 4 | 20 | 500 | No | 33.2% |
| Comparative Example 2 | Li$_{1.01}$Ni$_{0.83}$Co$_{0.13}$Al$_{0.03}$O$_2$ | LiFePO$_4$ | 4 | 20 | 500 | No | 24.7% |
| Comparative Example 3 | Li$_{1.01}$Ni$_{0.83}$Co$_{0.13}$Al$_{0.03}$O$_2$ | LiCoPO$_4$ | 4 | 20 | 500 | No | 21.3% |
| Comparative Example 4 | Li$_{1.01}$Ni$_{0.83}$Co$_{0.13}$Al$_{0.03}$O$_2$ | LiMnPO$_4$ | 4 | 20 | 500 | No | 24.1% |
| Comparative Example 5 | Li$_{1.01}$Ni$_{0.83}$Co$_{0.13}$Al$_{0.03}$O$_2$ | LNiPO$_4$ | 4 | 20 | 500 | No | 25.4% |
| Example 2 | Li$_{1.01}$Ni$_{0.83}$Co$_{0.13}$Al$_{0.03}$O$_2$ | LiVOPO$_4$ | 1 | 20 | 500 | No | 49.6% |
| Example 3 | Li$_{1.01}$Ni$_{0.83}$Co$_{0.13}$Al$_{0.03}$O$_2$ | LiVOPO$_4$ | 1.22 | 20 | 500 | No | 53.0% |
| Example 4 | Li$_{1.01}$Ni$_{0.83}$Co$_{0.13}$Al$_{0.03}$O$_2$ | LiVOPO$_4$ | 1.5 | 20 | 500 | No | 71.0% |
| Example 5 | Li$_{1.01}$Ni$_{0.83}$Co$_{0.13}$Al$_{0.03}$O$_2$ | LiVOPO$_4$ | 2.33 | 20 | 500 | No | 72.8% |
| Example 6 | Li$_{1.01}$Ni$_{0.83}$Co$_{0.13}$Al$_{0.03}$O$_2$ | LiVOPO$_4$ | 9 | 20 | 500 | No | 83.0% |
| Example 7 | Li$_{1.01}$Ni$_{0.83}$Co$_{0.13}$Al$_{0.03}$O$_2$ | LiVOPO$_4$ | 19 | 20 | 500 | No | 83.7% |
| Example 8 | Li$_{1.01}$Ni$_{0.83}$Co$_{0.13}$Al$_{0.03}$O$_2$ | LiVOPO$_4$ | 49 | 20 | 500 | No | 80.9% |
| Example 9 | Li$_{1.01}$Ni$_{0.83}$Co$_{0.13}$Al$_{0.03}$O$_2$ | LiVOPO$_4$ | 99 | 20 | 500 | No | 78.1% |
| Example 10 | Li$_{1.01}$Ni$_{0.83}$Co$_{0.13}$Al$_{0.03}$O$_2$ | LiVOPO$_4$ | 199 | 20 | 500 | No | 56.8% |
| Example 11 | Li$_{1.01}$Ni$_{0.83}$Co$_{0.13}$Al$_{0.03}$O$_2$ | LiVOPO$_4$ | 4 | 3 | 500 | No | 57.6% |
| Example 12 | Li$_{1.01}$Ni$_{0.83}$Co$_{0.13}$Al$_{0.03}$O$_2$ | LiVOPO$_4$ | 4 | 5 | 500 | No | 73.0% |
| Example 13 | Li$_{1.01}$Ni$_{0.83}$Co$_{0.13}$Al$_{0.03}$O$_2$ | LiVOPO$_4$ | 4 | 10 | 500 | No | 77.5% |
| Example 14 | Li$_{1.01}$Ni$_{0.83}$Co$_{0.13}$Al$_{0.03}$O$_2$ | LiVOPO$_4$ | 4 | 30 | 500 | No | 80.1% |
| Example 15 | Li$_{1.01}$Ni$_{0.83}$Co$_{0.13}$Al$_{0.03}$O$_2$ | LiVOPO$_4$ | 4 | 40 | 500 | No | 71.9% |
| Example 16 | Li$_{1.01}$Ni$_{0.83}$Co$_{0.13}$Al$_{0.03}$O$_2$ | LiVOPO$_4$ | 4 | 50 | 500 | No | 71.4% |
| Example 17 | Li$_{1.01}$Ni$_{0.83}$Co$_{0.13}$Al$_{0.03}$O$_2$ | LiVOPO$_4$ | 4 | 60 | 500 | No | 57.2% |
| Example 18 | Li$_{1.01}$Ni$_{0.83}$Co$_{0.13}$Al$_{0.03}$O$_2$ | LiVOPO$_4$ | 4 | 100 | 500 | No | 49.7% |
| Example 19 | Li$_{1.01}$Ni$_{0.83}$Co$_{0.13}$Al$_{0.03}$O$_2$ | LiVOPO$_4$ | 4 | 20 | 30 | No | 61.0% |
| Example 20 | Li$_{1.01}$Ni$_{0.83}$Co$_{0.13}$Al$_{0.03}$O$_2$ | LiVOPO$_4$ | 4 | 20 | 50 | No | 72.8% |
| Example 21 | Li$_{1.01}$Ni$_{0.83}$Co$_{0.13}$Al$_{0.03}$O$_2$ | LiVOPO$_4$ | 4 | 20 | 100 | No | 76.1% |
| Example 22 | Li$_{1.01}$Ni$_{0.83}$Co$_{0.13}$Al$_{0.03}$O$_2$ | LiVOPO$_4$ | 4 | 20 | 300 | No | 84.0% |
| Example 23 | Li$_{1.01}$Ni$_{0.83}$Co$_{0.13}$Al$_{0.03}$O$_2$ | LiVOPO$_4$ | 4 | 20 | 1000 | No | 77.2% |
| Example 24 | Li$_{1.01}$Ni$_{0.83}$Co$_{0.13}$Al$_{0.03}$O$_2$ | LiVOPO$_4$ | 4 | 20 | 1700 | No | 74.1% |
| Example 25 | Li$_{1.01}$Ni$_{0.83}$Co$_{0.13}$Al$_{0.03}$O$_2$ | LiVOPO$_4$ | 4 | 20 | 2000 | No | 75.4% |
| Example 26 | Li$_{1.01}$Ni$_{0.83}$Co$_{0.13}$Al$_{0.03}$O$_2$ | LiVOPO$_4$ | 4 | 20 | 2300 | No | 58.0% |
| Example 27 | Li$_{1.01}$Ni$_{0.83}$Co$_{0.13}$Al$_{0.03}$O$_2$ | LiVOPO$_4$ | 4 | 20 | 500 | Yes | 89.5% |
| Example 28 | Li$_{1.01}$Ni$_{0.83}$Co$_{0.13}$Al$_{0.03}$O$_2$ | LiVOPO$_4$ | 4 | 5 | 500 | Yes | 86.4% |
| Example 29 | Li$_{1.01}$Ni$_{0.83}$Co$_{0.13}$Al$_{0.03}$O$_2$ | LiVOPO$_4$ | 4 | 10 | 500 | Yes | 88.9% |
| Example 30 | Li$_{1.01}$Ni$_{0.83}$Co$_{0.13}$Al$_{0.03}$O$_2$ | LiVOPO$_4$ | 4 | 30 | 500 | Yes | 88.0% |
| Comparative Example 6 | LiCoO$_2$ | LiVOPO$_4$ | 4 | 20 | 500 | Yes | 39.4% |
| Comparative Example 7 | Li$_{1.01}$Ni$_{0.83}$Co$_{0.13}$Al$_{0.03}$O$_2$ | LiFePO$_4$ | 4 | 20 | 500 | Yes | 23.9% |

From Table 1, it is seen that high rate performance was obtained not just when the lithium-containing transition metal oxide represented by composition formula (1) and the compound represented by LiVOPO$_4$ had been mixed, but also from the positive electrode active materials in which the lithium-containing transition metal oxide had been coated with the compound represented by LiVOPO$_4$. It goes without saying that, as indicated by the Examples in Table 1, a clear effect was obtained when the Li—Ni—Co—Al-based oxide, or so-called NCA-based material, was used. This shows that the same effect can be obtained when a Li—Ni—Co—Mn-based oxide, or so-called NCM-based material, is used.

Example 31

A battery cell was fabricated and evaluated by the same method as in Example 1 with the exception that, during the fabrication of the positive electrode, the ratio c/d of the combined mass c of the lithium-containing transition metal oxide and the compound represented by LiVOPO$_4$ to the mass d of the carbon material was 3.

Example 32

A battery cell was fabricated and evaluated by the same method as in Example 1 with the exception that, during the fabrication of the positive electrode, the ratio c/d of the combined mass c of the lithium-containing transition metal oxide and the compound represented by LiVOPO$_4$ to the mass d of the carbon material was 4.

Example 33

A battery cell was fabricated and evaluated by the same method as in Example 1 with the exception that, during the fabrication of the positive electrode, the ratio c/d of the combined mass c of the lithium-containing transition metal oxide and the compound represented by LiVOPO$_4$ to the mass d of the carbon material was 5.67.

Example 34

A battery cell was fabricated and evaluated by the same method as in Example 1 with the exception that, during the fabrication of the positive electrode, the ratio c/d of the combined mass c of the lithium-containing transition metal oxide and the compound represented by LiVOPO$_4$ to the mass d of the carbon material was 9.

Example 35

A battery cell was fabricated and evaluated by the same method as in Example 1 with the exception that, during the fabrication of the positive electrode, the ratio c/d of the combined mass c of the lithium-containing transition metal oxide and the compound represented by LiVOPO$_4$ to the mass d of the carbon material was 49.

Example 36

A battery cell was fabricated and evaluated by the same method as in Example 1 with the exception that, during the fabrication of the positive electrode, the ratio c/d of the combined mass c of the lithium-containing transition metal oxide and the compound represented by LiVOPO$_4$ to the mass d of the carbon material was 99.

Example 37

A battery cell was fabricated and evaluated by the same method as in Example 1 with the exception that, during the fabrication of the positive electrode, the ratio c/d of the combined mass c of the lithium-containing transition metal oxide and the compound represented by LiVOPO$_4$ to the mass d of the carbon material was 199.

The evaluation results of Examples 31 to 37 are shown in Table 2.

TABLE 2

| | Lithium-containing transition metal oxide | Compound represented by LiVOPO$_4$ or olivine compound | c/d | Rate performance |
|---|---|---|---|---|
| Example 31 | Li$_{1.01}$Ni$_{0.83}$Co$_{0.13}$Al$_{0.03}$O$_2$ | LiVOPO$_4$ | 3 | 61.0% |
| Example 32 | Li$_{1.01}$Ni$_{0.83}$Co$_{0.13}$Al$_{0.03}$O$_2$ | LiVOPO$_4$ | 4 | 77.5% |
| Example 33 | Li$_{1.01}$Ni$_{0.83}$Co$_{0.13}$Al$_{0.03}$O$_2$ | LiVOPO$_4$ | 5.67 | 81.9% |
| Example 34 | Li$_{1.01}$Ni$_{0.83}$Co$_{0.13}$Al$_{0.03}$O$_2$ | LiVOPO$_4$ | 9 | 81.9% |
| Example 35 | Li$_{1.01}$Ni$_{0.83}$Co$_{0.13}$Al$_{0.03}$O$_2$ | LiVOPO$_4$ | 49 | 82.3% |
| Example 36 | Li$_{1.01}$Ni$_{0.83}$Co$_{0.13}$Al$_{0.03}$O$_2$ | LiVOPO$_4$ | 99 | 81.9% |
| Example 37 | Li$_{1.01}$Ni$_{0.83}$Co$_{0.13}$Al$_{0.03}$O$_2$ | LiVOPO$_4$ | 199 | 66.0% |

From Table 2, it is seen that particularly high rate performance was obtained when the ratio c/d of the combined mass c of the lithium-containing transition metal oxide represented by composition formula (1) and the compound represented by LiVOPO$_4$ to the mass d of the carbon material was in the range of 4≤c/d≤99.

Example 38

A battery cell was fabricated and evaluated by the same method as in Example 1 with the exception that, during the fabrication of the positive electrode, as the lithium-containing transition metal oxide, Li$_{1.01}$Ni$_{0.8}$Co$_{0.15}$Al$_{0.05}$O$_2$ was used instead of Li$_{1.01}$Ni$_{0.83}$Co$_{0.13}$Al$_{0.03}$O$_2$.

Example 39

A battery cell was fabricated and evaluated by the same method as in Example 1 with the exception that, during the fabrication of the positive electrode, Li$_{1.01}$Ni$_{0.81}$Co$_{0.15}$Al$_{0.04}$O$_2$ was used instead of Li$_{1.01}$Ni$_{0.83}$Co$_{0.13}$Al$_{0.03}$O$_2$ as the lithium-containing transition metal oxide.

Example 40

A battery cell was fabricated and evaluated by the same method as in Example 1 with the exception that, during the fabrication of the positive electrode, Li$_{1.01}$Ni$_{0.86}$Co$_{0.1}$Al$_{0.04}$O$_2$ was used instead of Li$_{1.01}$Ni$_{0.83}$Co$_{0.13}$Al$_{0.03}$O$_2$ as the lithium-containing transition metal oxide.

The evaluation results of Examples 38 to 40 are shown in Table 3.

TABLE 3

| | Lithium-containing transition metal oxide | Compound represented by LiVOPO$_4$ or olivine compound | a/b | r [μM] | s [nm] | Coating step | Rate performance |
|---|---|---|---|---|---|---|---|
| Example 38 | Li$_{1.01}$Ni$_{0.80}$Co$_{0.15}$Al$_{0.05}$O$_2$ | LiVOPO$_4$ | 4 | 20 | 500 | No | 85.7% |
| Example 39 | Li$_{1.01}$Ni$_{0.81}$Co$_{0.15}$Al$_{0.04}$O$_2$ | LiVOPO$_4$ | 4 | 20 | 500 | No | 85.0% |
| Example 40 | Li$_{1.01}$Ni$_{0.86}$Co$_{0.1}$Al$_{0.04}$O$_2$ | LiVOPO$_4$ | 4 | 20 | 500 | No | 81.5% |

From Table 3, it is seen that high rate performance was obtained from the positive electrode active materials in which LiNiCoAlO$_2$ with different compositions as the lithium-containing transition metal oxide represented by composition formula (1) and the compound represented by LiVOPO$_4$ had been mixed.

Comparative Example 8

For the positive electrode active material, the lithium-containing transition metal oxide and the compound represented by LiVOPO$_4$ were respectively weighed at the mass ratio of 80:20 and prepared. Then, 90 parts by mass of a powder of the lithium-containing transition metal oxide, 5 parts by mass of acetylene black, and 5 parts by mass of polyvinylidene fluoride (PVDF) were dispersed in N-methyl-2-pyrrolidone (NMP), thereby preparing a slurry. The slurry provided a first positive electrode slurry. Similarly, 90 parts by mass of a powder of the compound represented by LiVOPO$_4$, 5 parts by mass of acetylene black, and 5 parts by mass of polyvinylidene fluoride (PVDF) were dispersed in N-methyl-2-pyrrolidone (NMP), thereby preparing a slurry. The slurry provided a second positive electrode slurry. The first positive electrode slurry was coated on an aluminum foil with a thickness of 20 μm. The aluminum foil with the first positive electrode slurry coated thereon was dried at a temperature of 140° C. for 30 minutes. Thereafter, the aluminum foil was additionally coated with the second positive electrode slurry. The aluminum foil with the second positive electrode slurry coated thereon was again dried at a temperature of 140° C. for 30 minutes. The dried aluminum foil was subjected to a press process at a linear pressure of 1000 kgf/cm using a roll press device. In this way, the positive electrode was obtained. With the exception of using the positive electrode thus fabricated, a battery cell was fabricated and evaluated by the same method as in Example 1.

Comparative Example 9

A battery cell was fabricated and evaluated by the same method as in Comparative Example 8 with the exception that, during the fabrication of the positive electrode, the sequence of coating the first positive electrode slurry and the second positive electrode slurry was reversed.

The evaluation results of Comparative Examples 8, 9 are shown in Table 4.

TABLE 4

| | Lithium-containing transition metal oxide | Compound represented by LiVOPO$_4$ or olivine compound | a/b | r [μm] | s [nm] | Rate performance |
|---|---|---|---|---|---|---|
| Comparative Example 8 | Li$_{1.01}$Ni$_{0.80}$Co$_{0.15}$Al$_{0.05}$O$_2$ | LiVOPO$_4$ | 4 | 20 | 500 | 38.7% |
| Comparative Example 9 | Li$_{1.01}$Ni$_{0.81}$Co$_{0.15}$Al$_{0.05}$O$_2$ | LiVOPO$_4$ | 4 | 20 | 500 | 38.5% |

From Table 4, it is seen that sufficient rate performance cannot be obtained from the positive electrodes in which the lithium-containing transition metal oxide and the compound represented by LiVOPO$_4$ had not been dispersed, and in which a dual-layer structure had been formed.

As will be seen from the above evaluation results, it can be confirmed that Examples 1 to 40 provided high rate performance compared with Comparative Examples 1 to 9.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode comprising:
   a positive electrode current collector; and
   a positive electrode active material layer disposed on the positive electrode current collector,
   wherein the positive electrode active material layer contains a lithium-containing transition metal oxide represented by composition formula (1) and a compound represented by LiVOPO$_4$:

$$Li_tNi_xCo_yAl_zO_2 \quad (1)$$

where 0.9≤t≤1.1, 0.3<x<0.99, 0.01<y<0.4, 0.001<z<0.2, and x+y+z=1,
   the lithium-containing transition metal oxide and the compound represented by LiVOPO$_4$ are dispersed and uniformly distributed in the positive electrode active material layer,
   a primary particle diameter (s) of the compound represented by LiVOPO$_4$ is not less than 50 nm and not more than 2 μm,
   the lithium-containing transition metal oxide is in the form of secondary particles, and
   a secondary particle diameter (r) of the lithium-containing transition metal oxide is not less than 3 μm and not more than 100 μm.

2. The positive electrode according to claim 1, wherein a ratio a/b of a mass (a) of the lithium-containing transition metal oxide to a mass (b) of the compound represented by LiVOPO$_4$ is in a range of 1.22≤a/b≤199.

3. The positive electrode according to claim 1, wherein the lithium-containing transition metal oxide is in the form of spherical secondary particles.

4. The positive electrode according to claim 1, wherein the compound represented by LiVOPO$_4$ coats secondary particles of the lithium-containing transition metal oxide, and is filled between primary particles at least on the surface of the secondary particle.

5. The positive electrode according to claim 1, further comprising a carbon material,
   wherein a ratio c/d of a combined mass (c) of the lithium-containing transition metal oxide and the compound represented by LiVOPO$_4$ to a mass (d) of the carbon material is in a range of 4≤c/d≤99.

6. A lithium ion secondary battery comprising:
   the positive electrode according to claim 1;
   a negative electrode;
   a separator; and
   an electrolytic solution.

7. The positive electrode according to claim 2, wherein 1.5≤a/b≤99.

8. The positive electrode according to claim 1, wherein r is not less than 5 μm and not more than 50 μm.

9. The positive electrode according to claim 1, wherein r is not less than 5 μm and not more than 30 μm.

10. The positive electrode according to claim 1, wherein s is not less than 300 nm and not more than 0.5 μm.

* * * * *